Nov. 28, 1961   M. DE GOOD ET AL   3,010,409
PALLETS
Filed June 19, 1958

INVENTOR.
MAYNARD DEGOOD
CLARENCE L. FILKINS
BY
*Price and Henevold*
ATTORNEYS

United States Patent Office 3,010,409
Patented Nov. 28, 1961

3,010,409
PALLETS
Maynard De Good and Clarence L. Filkins, Grand Rapids, Mich., assignors to The Rapids-Standard Company, Inc., Grand Rapids, Mich., a corporation of Michigan
Filed June 19, 1958, Ser. No. 743,205
4 Claims. (Cl. 104—135)

This invention relates to load carrying pallets in general and more particularly to pallets for carrying elongated articles.

In warehouses, plants, and factories it is often desirable to be able to move elongated articles from one place to another. This includes elongated lengths of stock material which are stored for future use. Such stock is generally tied together for greater ease in handling but in being so grouped the stock material proves a heavy and cumbersome load to move from one place to another.

It is an object of this invention to disclose a special elongated form of load carrying pallet for article loads of the type just mentioned. The proposed pallet forms are adapted to receive and support the elongated articles, throughout their length, for greater ease in handling; particularly as regards loading and unloading in storage facilities and for transfer by conveyor means.

The pallets of this invention are disclosed as used with lengths of wheeled conveyor track sections. These flow tracks are commonly used in storage bins as well as for conveyor purposes. The weeled flow tracks are normally disposed in parallel spaced relation and are either slightly inclined for gravity feed or have some power driven means provided in combination therewith.

One form of pallet includes parallel spaced inverted channel section members of suitable length for the elongated load to be carried, and having load bearing cross members secured between them. The elongated channel members serve as guides for the pallet as received on parallel spaced flow tracks. The side wall flanges of the channel members are formed to diverge outwardly from the wheel receiving web thereof to avoid interference with the rotatable wheels of the flow tracks. Both the elongated guide members and the cross supports are the same form so that only one form need be rolled by the mill and stock can be cut to desired lengths.

Another form of pallet for elongated article loads includes separate end pallet members disposed in spaced relation to each other for receiving and supporting opposite ends of the elongated load to be carried. The end pallet members are both alike. They are formed from a plate member to include side wall flanges and each have one end closed by an end wall flange while the other end remains open. The plate members are also formed to include reinforcing ribs lengthwise thereof and to have inverted channel portions open on the underside thereof. The channel portions serve as guides for receiving the wheeled conveyor track sections.

The latter form of pallet may include another feature. The end pallets may have a load bearing cross member secured across the pallet and between the ends thereof. Such load bearing cross member supports the work load free from engagement with the ends of the pallet member.

The aforementioned and other advantages and objects in the practice of this invention will be more apparent in the description and illustration of working embodiments thereof as hereinafter set forth.

Figure 1:
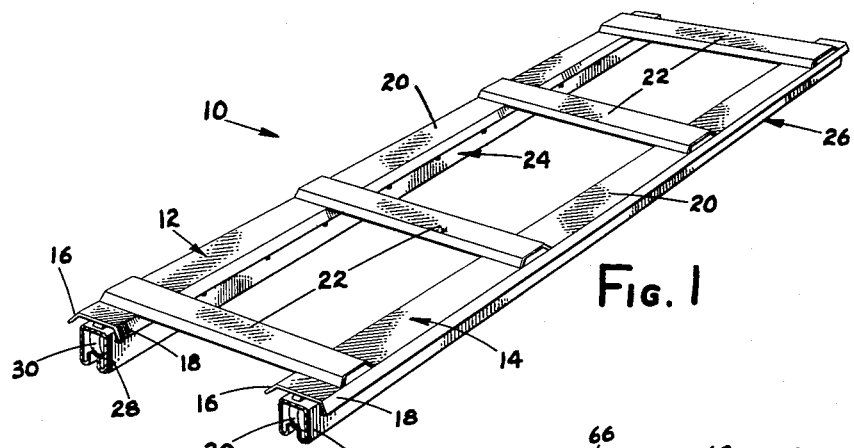
FIG. 1 is a perspective view of the elongated pallet form of this invention.

The elongated pallet 10, shown by FIG. 1, includes a pair of inverted channel section members 12 and 14. The channel section members 12 and 14 are open downwardly and each includes side wall flanges 16 and 18. The side wall flanges 16 and 18 are divergently extended from the web 20 of the channel members.

The channel members 12 and 14 are disposed in parallel spaced relation to each other and include load bearing cross supports 22 which are secured therebetween. The cross supports 22 are of the same shape and form as the channel members 12 and 14. However, they are shorter. The cross supports 22 and uniformly spaced apart along the length of the channel members. The channel shape of the cross supports provides structural strength for load bearing purposes.

The channel members 12 and 14 are received over elongated flow track sections 24 and 26. These flow track sections may form a part of a storage bin or may be part of a conveyor. The track sections include rail members 28 having a plurality of conveyor wheels 30 mounted for rotation thereon. The wheels 30 each have their load bearing surface disposed above the rail members and in a common plane. The wheels 30 are received within the channel members 12 and 14 in engagement with the web portion 20 thereof. The side flanges 16 and 18 of the channel members are spaced apart sufficiently, and diverge outwardly enough, to avoid any interference with the flow track rails 28.

Figure 2:
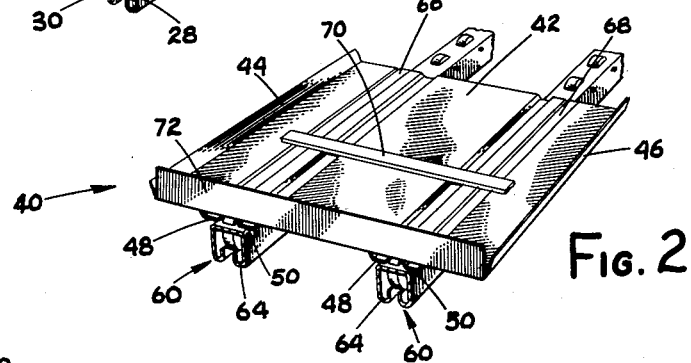
FIG. 2 is a perspective view of the end pallet form of this invention.
Figure 3:
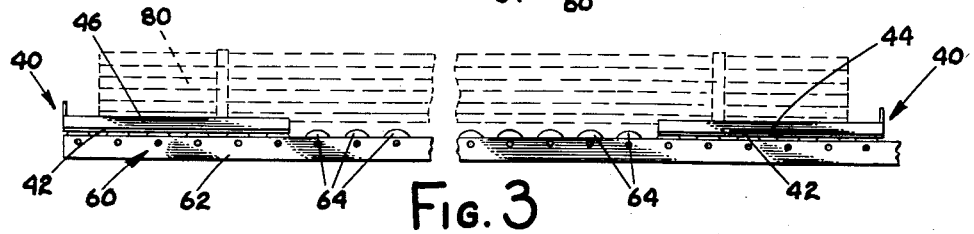
FIG. 3 is a side view of a length of wheeled flow track having the end pallets of this invention disposed thereon and supporting an elongated article load.
Figure 4:
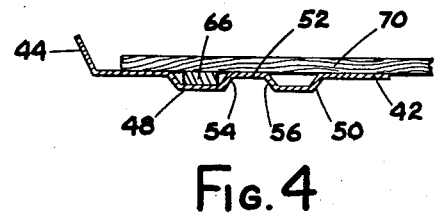
FIG. 4 is an enlarged cross sectional end view through a part of one of the end pallet members.

The end pallets 40 are shown by FIGS. 2-4. These pallets are formed from a plate member 42. The plate member 42 is originally rectangular in shape. It is formed to include upwardly disposed side wall flanges 44 and 46. The plate member is also formed to include a pair of closely spaced channel ribs 48 and 50 on the underside and near each side thereof. These ribs provide added structural strength to the pallet plate lengthwise thereof. The channel ribs 48 and 50 also form a downwardly open channel portion 52 on the underside of the pallet.

The channel portions 52 are spaced near opposite side edges of the pallet. Their side walls are formed by the side walls 54 and 56 of the strengthening ribs 48 and 50, respectively. The channel portions are disposed in parallel spaced relation to each other and are adapted to receive track sections 60 therein. The guide means 60 includes elongated sections of wheeled conveyor track. The track sections 60 include rails 62 having a plurality of wheels 64 rotatably mounted thereon. The track sections 60 may be part of a storage bin or of a conveyor. The wheels 64 are received in the channel portion grooves 52 and the side wall flanges 54 and 56 of the channel groove are divergently disposed to avoid interference with the wheels.

Figure 5:
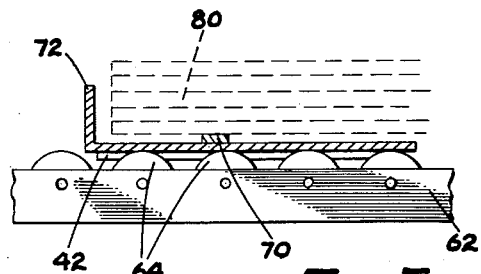
FIG. 5 is an enlarged cross sectioned side view of one of the end pallets as disposed on a length of wheeled flow track and having a load supported thereon.

Reinforcing straps 66 and 68 are disposed in each of the outermost reinforcing ribs 48 and 50. A load bearing tie strap 70 is secured across the pallet plate 42 intermediate the ends thereof, but closer to the front of the pallet than the rear of the pallet as shown in FIG. 5. The load bearing strap member 70 lies on the surface of the pallet plate 42 and receives and supports the end of a load 80 in spaced relation to the ends of the pallet.

An end wall flange 72 is mounted on one end of the pallet plates 42, between the side wall flanges 44 and 46. The other end of the pallet is open and unobstructed. This enables the end of an elongated load, as 80 in FIGS. 3 and 4, to be received on the pallet at the open end while the flanges 44, 46 and 72 serve as guides and prevent the end of the load from extending beyond the pallet.

In the use of the load carry pallet comprising the two end pallets 40, the load 80 is supported in spaced relation over the flow tracks on which it is supported. The end pallets 40 are, in effect, tied together by the load 80. Accordingly, small end pan type pallets may be used in place of an elongated pallet form. Such small pallets are much cheaper to make, and are easier to handle and store when not in use.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

We claim:

1. In a conveyor system for transporting rigid elongated articles: separate end pallet members supporting the opposite ends of said articles, said end pallet members each being a plate member formed to provide upwardly disposed side wall flanges, an end wall flange provided at one end of said plate members and between said side wall flanges, the other end of said plate members being open, and inverted open faced channel portions formed therein on the underside of said plate members and in parallel spaced relation to each other for receiving guide means therein.

2. In a conveyor system for transporting rigid elongated articles: separate end pallet members supporting the opposite ends of said articles, said end pallet members each including a plate member formed to provide upwardly disposed side wall flanges, an end wall flange provided at one end of said plate members and between said side wall flanges, the other end of said plate members being open, said plate members being formed to include a pair of downwardly open channel portions on the underside thereof and in parallel spaced relation to each other for receiving guide means therein, and said channel portions having the flanges thereof disposed to form strengthening ribs for said plate member.

3. In a conveyor system for transporting rigid elongated articles: separate end pallet members supporting the opposite ends of said articles, said end pallet members each including a plate member having the side edges thereof formed to provide upstanding side wall flanges, an upstanding end wall flange provided at one end of said plate members and between said side wall flanges, the other end of said plate members being open, said plate members being formed to provide a pair of parallel spaced downwardly open channel portions on the underside thereof, said channel portions including side flanges provided by reinforcing ribs formed on the underside of said plate member, reinforcement bars secured within said reinforcing ribs for further strengthening of said end pallet, and a transversely disposed load bearing member secured across said plate member between the open and closed ends thereof.

4. A load carrying pallet for use with wheeled conveyor track sections comprising: the pallet member being constructed of a single plate, said plate member being formed to have upwardly disposed side wall flanges and at least one end wall flange; and open faced channel portions formed from said plate by ribs in the underside thereof in parallel spaced relation to each other and to the side edges and adapted to receive said wheeled conveyor track sections and be guided thereby.

References Cited in the file of this patent

UNITED STATES PATENTS

| | | |
|---|---|---|
| 1,497,754 | Howard | June 17, 1924 |
| 1,751,717 | Romine | Mar. 25, 1930 |
| 2,455,197 | Sullivan | Nov. 30, 1948 |
| 2,467,354 | Baldwin | Apr. 12, 1949 |
| 2,544,743 | Vrabcak | Mar 13, 1951 |
| 2,615,661 | Cushman | Oct. 28, 1952 |
| 2,626,456 | Harrison | Jan. 27, 1953 |
| 2,634,931 | Weitzel | Apr. 14, 1953 |
| 2,652,785 | Cox | Sept. 22, 1953 |

FOREIGN PATENTS

| | | |
|---|---|---|
| 146,867 | Germany | Dec. 22, 1903 |